US008124699B2

(12) United States Patent
Durali et al.

(10) Patent No.: US 8,124,699 B2
(45) Date of Patent: Feb. 28, 2012

(54) POLYMERIZATION OF FLUOROPOLYMERS USING ALKYL PHOSPHONATE SURFACTANTS

(75) Inventors: Mehdi Durali, West Chester, PA (US); Lotfi Hedhli, King of Prussia, PA (US); Roice Wille, Malvern, PA (US)

(73) Assignee: Arkema Inc., King of Prussia, PA (US)

( * ) Notice: Subject to any disclaimer, the term of this patent is extended or adjusted under 35 U.S.C. 154(b) by 890 days.

(21) Appl. No.: 11/499,552

(22) Filed: Aug. 4, 2006

(65) Prior Publication Data

US 2007/0032591 A1 Feb. 8, 2007

Related U.S. Application Data

(60) Provisional application No. 60/706,463, filed on Aug. 8, 2005.

(51) Int. Cl.
  *C08F 12/20* (2006.01)
(52) U.S. Cl. ........ 526/173; 526/179; 526/193; 526/242; 526/249; 526/250; 526/253; 526/254; 526/255; 526/911
(58) Field of Classification Search .................. 524/544; 526/242, 250
See application file for complete search history.

(56) References Cited

U.S. PATENT DOCUMENTS

| 2,471,959 | A | | 10/1869 | McCain et al. | |
|---|---|---|---|---|---|
| 2,559,752 | A | * | 7/1951 | Berry | 524/723 |
| 3,857,827 | A | | 12/1974 | Dohany | |
| 4,076,929 | A | | 2/1978 | Dohany | |
| 4,082,659 | A | * | 4/1978 | Heinze et al. | 210/636 |
| 4,233,198 | A | * | 11/1980 | Nolken | 524/710 |
| 4,360,652 | A | | 11/1982 | Dohany | |
| 4,369,266 | A | * | 1/1983 | Kuhls et al. | 523/332 |
| 4,524,197 | A | | 6/1985 | Khan | |
| 4,569,978 | A | | 2/1986 | Barber | |
| 5,616,645 | A | * | 4/1997 | Kuwamura et al. | 524/546 |
| 5,763,552 | A | | 6/1998 | Feiring et al. | |
| 6,187,885 | B1 | | 2/2001 | Barber | |
| 6,841,616 | B2 | | 1/2005 | Wille et al. | |
| 6,869,997 | B2 | | 3/2005 | Wille et al. | |
| 2003/0181572 | A1 | * | 9/2003 | Tan et al. | 524/502 |

FOREIGN PATENT DOCUMENTS

| JP | 2001316406 A | * 11/2001 |
|---|---|---|
| WO | WO 95/08598 | 3/1995 |

OTHER PUBLICATIONS

Machine translation of JP2001316406A.*

* cited by examiner

*Primary Examiner* — Mark Eashoo
*Assistant Examiner* — Nicole M Buie-Hatcher
(74) *Attorney, Agent, or Firm* — Thomas F. Roland

(57) ABSTRACT

The present invention relates to a method for the polymerization of fluoromonomers using non-fluorinated alkyl phosphonate surfactants, and to the fluoropolymers formed thereby. Specifically, the method of the polymerization uses one or more alkyl phosphonic acids or salts thereof.

12 Claims, No Drawings

POLYMERIZATION OF FLUOROPOLYMERS USING ALKYL PHOSPHONATE SURFACTANTS

This application claims benefit, under U.S.C. §119(e) of U.S. provisional application 60/706463 filed Aug. 8, 2005.

FIELD OF THE INVENTION

The present invention relates to a method for the polymerization of fluoromonomers using non-fluorinated alkyl phosphonate surfactants, and to the fluoropolymers formed thereby. Specifically, the method of the polymerization uses one or more alkyl phosphonic acids or salts thereof.

BACKGROUND OF THE INVENTION

Fluoropolymers are primarily produced via heterogeneous polymerization reactions, including suspension, emulsion and microemulsion systems. Generally, each of these reactions requires at least one monomer and a radical initiator in a suitable reaction medium. In addition, emulsion polymerizations of halogen-containing monomers generally require a surfactant capable of emulsifying both the reactants and the reaction products for the duration of the polymerization reaction. The surfactant of choice in the synthesis of fluoropolymers is generally a perfluoroalkyl surfactant. The high degree of fluorination of the surfactant avoids atom transfer between a growing polymer chain and the surfactant during polymerization, which will result in lowered molecular weights in the product and likely inhibition of the reaction. The most common perfluoroalkyl surfactant in the production of halogenated polymers is ammonium perfluorooctanoate (AFPO).

The emulsion polymerization of vinylidene fluoride ($VF_2$) using a fluorinated surfactant and isopropyl peroxydicarbonate (IPP) as a free-radical initiator, is taught in U.S. Pat. No. 3,475,396. This polymerization process has since been refined to provide polymers having various improved properties. See U.S. Pat. Nos. 3,857,827; 4,076,929; 4,360,652; 4,569,978; 6,187,885.

Fluorosurfactants are expensive, specialized materials, however. In addition, because of their high stability, they tend to persist in the environment. Because of their resistance to chemical degradation, fluoroalkyl surfactants have the potential to accumulate in the environment and in organisms.

New polymerization processes are needed that utilize non-perfluoroalkyl surfactants or reduced amounts of perfluoroalkyl surfactants. In order to address this issue, several different approaches have attempted to reduce or eliminate the use of perfluoroalkyl surfactants in the polymerization of halogen-containing monomers.

Some emulsion polymerization processes have been demonstrated which employ partially fluorinated surfactants instead of perfluorinated surfactants. See U.S. Pat. Nos. 4,524,197; 5,763,552. Another attempt to reduce the amount of perfluoroalkyl surfactant in heterogeneous polymerization involved a protocol wherein a conventional fluorinated surfactant was added in combination with a non-fluorinated hydrocarbon surfactant. However, this modification served to substantially lower the rate of the reaction. See, WO 95-08598A, the entire disclosure of which is incorporated herein by reference.

Another attempt to reduce the amount of perfluoroalkyl surfactant in heterogeneous polymerization involved a protocol wherein a conventional fluorinated surfactant was added in combination with a non-fluorinated hydrocarbon surfactant. However, this modification served to substantially lower the rate of the reaction. See, WO 95-08598A, the entire disclosure of which is incorporated herein by reference.

U.S. Pat. No. 2,559,752 assigned to E. I. du Pont de Nemours relates to an "Aqueous colloidal dispersions of polymers". Stable aqueous colloidal dispersions of polymerized ethylenically unsaturated organic compounds are obtained by carrying out the polymerization in the presence of a $H_2O$-soluble polymerization initiator, such as an alkali persulfate or an aliphatic azo compound (cf. U.S. Pat. No. 2,471,959, C. A. 43, 6002 g), and a polyfluorinated ionizable dispersing agent (I). The I is taken from various groups of compounds including:

polyfluoroalkanoic acids, $X(CF_2)nCO2H$, polyfluoroalkyl di-H phosphates, $X(CF2)nCH2OPO(OH)2$ [obtainable from $X(CF2)nCH2OH$ and $P2O5$ or $POCl3$), and their $NH4$ or alkali-metal salts];

polyfluoroalkyl H sulfates, $X(CF_2)nCH_2OSO_3H$ and their $NH4$ or alkali-metal salts;

polyfluoro alkane phosphonic acids, $H(CF2)nPO(OH)_2$ [obtainable from $C_2F_4$ and a dialkyl phosphite in the presence of a free-radical producing catalyst, followed by hydrolysis] and their $NH4$ or Na salts.

U.S. Pat. No. 6,869,997, incorporated herein by reference, describes the use of a 3-allyloxy-2-hydroxy-1-propanesulfonic acid salt as the surfactant in the preparation of a fluoropolymer.

U.S. Pat. No. 6,841,616 incorporated herein by reference, describes the use of a siloxane, based surfactant as the surfactant in the preparation of a fluoropolymer.

None of the art references described above mentions the use of non-fluorinated alkylphosphonic acids, or their salts, as surfactants in the synthesis of fluorinated polymers.

Surprisingly it was found that alkyl phosphonic acids or their salts may be used as surfactants in the synthesis of fluorinated polymers, and thereby eliminate or significantly reduce the use of fluorinated surfactants.

SUMMARY OF THE INVENTION

The invention relates to a process for preparing a fluoropolymer in an aqueous reaction medium comprising:

a) forming an aqueous emulsion comprising at least one radical initiator, at least one alkyl phosphonic acid surfactant or salt thereof, and at least one fluoromonomer, and b) initiating polymerization of said fluoromonomer, The invention further relates to a fluoropolymer resin formed in an aqueous medium using at least one non-fluorinated alkyl phosphonic acid surfactant or the salts thereof.

DETAILED DESCRIPTION OF THE INVENTION

The invention relates to the polymerization of fluoropolymers using as the surfactant alkyl phosphonic acids and the salts thereof.

In the process of the invention, a polymerization reaction is carried out by charging a reactor with water (preferably deionized water), at least one alkyl phosphonic acid surfactant, at least one fluoromonomer and optionally, a chain-transfer agent and an antifoulant. Air may be purged from the reactor prior to the introduction of the fluoromonomer. Water is added to the reactor before bringing the reactor to the desired starting temperature, but the other materials may be added before or after bringing the reactor to temperature. At least one radical initiator is added to start and maintain the polymerization reaction. Additional monomer may be optionally added to replenish monomer that is consumed, and the other materials may be optionally added during the course of the polymerization to maintain the reaction and control the final product properties.

Surfactant

The term "surfactant" means a type of molecule which has both hydrophobic and hydrophilic portions, which allows it to stabilize and disperse hydrophobic molecules and aggregates of hydrophobic molecules in aqueous systems.

"Alkyl phosphonic acid" surfactants and "alkyl phosphonate" surfactants are both used to describe surfactants having linear, branched, or cyclic (not aromatic) hydrocarbons containing from 6 to 20 carbon atoms as their hydrophobic portion, and for their hydrophilic portion, the hydrocarbons are functionalized with one or more phosphonic acid or phosphonate groups. Preferably the surfactants contain linear hydrocarbons having from 6 to 12 carbon atoms as their hydrophobic portion, and for their hydrophilic portion, the hydrocarbons are functionalized with one or more phosphonic acid or phosphonate groups. The alkyl phosphonate surfactants may be represented for instance as: $R—PO_3M$ or $MO_3P—R—PO_3M$, where R is the hydrocarbon portion, and where M is a monovalent cation selected from the group including hydrogen ion, alkali metal ion, ammonium ion, and monoalkyl, dialkyl, trialkyl, or tetraalkyl ammonium ion, with the alkyl parts of the monoalkyl, dialkyl, trialkyl, or tetraalkyl ammonium ion each having one to four carbon atoms. The surfactants may be used as mixtures with one another.

The surfactant may be in the acid form, be partially neutralized or fully neutralized. Preferably, the alkyl phosphonate surfactants are in a salt form. Especially preferred alkyl phosphonate surfactants are the ammonium or sodium salts of octyl phosphonic acid, dodecyl phosphonic acid, and their mixtures.

The alkyl phosphonate surfactants are used in an amount from about 0.001 to about 2.0 weight percent on total monomer, and preferably at from about 0.001 to about 0.5 weight percent on total monomer. The surfactants may be used in solution such as in aqueous solution for convenient handling. The alkyl phosphonic acid surfactants are water-soluble or water dispersible.

Other co-surfactants can also be used with the alkyl phosphonic acid surfactants of the invention. Preferred co-surfactants are non-fluorinated hydrocarbon surfactants, a siloxane surfactant or a combination thereof.

Fluoromonomers

The term "fluoromonomer" or the expression "fluorinated monomer" means a polymerizable alkene which contains at least one fluorine atom, fluoroalkyl group, or fluoroalkoxy group attached to the double bond of the alkene that undergoes polymerization. The term "fluoropolymer" means a polymer formed by the polymerization of at least one fluoromonomer, and it is inclusive of homopolymers, copolymers, terpolymers and higher polymers which are thermoplastic in their nature, meaning they are capable of being formed into useful pieces by flowing upon the application of heat, such as is done in molding and extrusion processes. The fluoropolymer preferably contains at least 50 mole percent of one or more flouromonomers. The thermoplastic polymers typically exhibit a crystalline melting point.

Fluoromonomers useful in the practice of the invention include, for example, vinylidene fluoride ($VF_2$), tetrafluoroethylene (TFE), trifluoroethylene, chlorotrifluoroethylene (CTFE), hexafluoropropene (HFP), vinyl fluoride, hexafluoroisobutylene, perfluorobutylethylene (PFBE), pentafluoropropene, 3,3,3-trifluoro-1-propene, 2-trifluoromethyl-3,3,3-trifluoropropene a fluorinated vinyl ether, a fluorinated allyl ether, a non-fluorinated allyl ether, a fluorinated dioxole, and combinations thereof.

Especially preferred copolymers made by the process of the invention are copolymers comprising from about 71 to about 99 weight percent VDF, and correspondingly from about 1 to about 29 percent TFE; from about 71 to 99 weight percent VDF, and correspondingly from about 1 to 29 percent HFP (such as disclosed in U.S. Pat. No. 3,178,399); from about 71 to 99 weight percent VDF, and correspondingly from about 1 to 29 percent CTFE; and from about 71 to 99 weight percent VDF, and correspondingly from about 1 to 29 weight percent trifluoroethylene.

Especially preferred terpolymers are the terpolymer of VDF, HFP and TFE, and the terpolymer of VDF, trifluoroethene, and TFE. The especially preferred terpolymers have at least 10 weight percent VDF, and the other comonomers may be present in varying portions, but together they comprise up to 90 weight percent of the terpolymer.

Initiators

The term "initiator" and the expressions "radical initiator" and "free radical initiator" refer to a chemical that is capable of providing a source of free radicals, either induced spontaneously, or by exposure to heat or light. Examples of initiators include peroxides, peroxydicarbonates and azo compounds. The term expression also includes redox systems useful in providing a source of free radicals. The term "radical" and the expression "free radical" refer to a chemical species that contains at least one unpaired electron.

The radical initiator is added to the reaction mixture in an amount sufficient to initiate and maintain the polymerization reaction at a desired reaction rate. The order of addition may vary according to the desired process and latex emulsion characteristics.

The radical initiator may comprise a persulfate salt, such as sodium persulfate, potassium persulfate, or ammonium persulfate. The amount of persulfate salt added to the reaction mixture (based upon the total weight of monomer added to the reaction mixture) is from about 0.002 to about 1.0 weight percent.

The radical initiator may comprise an organic peroxide such as an alkyl, dialkyl, or diacyl peroxide, peroxydicarbonate, and peroxy ester in an amount from about 0.5 to about 2.5 weight percent on total monomer.

Chain-Transfer Agents

Chain-transfer agents are added to the polymerization to regulate the molecular weight of the product. They may added to a polymerization in a single portion at the beginning of the reaction, or incrementally or continuously throughout the reaction. The amount and mode of addition of chain-transfer agent depend on the activity of the particular chain-transfer agent employed, and on the desired molecular weight of the polymer product. The amount of chain-transfer agent added to the polymerization reaction is preferably from about 0.05 to about 5 weight percent, more preferably from about 0.1 to about 2 weight percent based on the total weight of monomer added to the reaction mixture.

Examples of chain transfer agents useful in the present invention include, but are not limited to oxygenated compounds such as alcohols, carbonates, ketones, esters, and ethers may serve as chain-transfer agents; halocarbons and hydrohalocarbons, such as chlorocarbons, hydrochlorocarbons, chlorofluorocarbons and hydrochlorofluorocarbons; ethane and propane.

Buffering Agent

The polymerization reaction mixture may optionally contain a buffering agent to maintain a controlled pH throughout the polymerization reaction. The pH is preferably controlled within the range of from about 4 to about 8, to minimize undesirable color development in the product.

Buffering agents may comprise an organic or inorganic acid or alkali metal salt thereof, or base or salt of such organic or inorganic acid, that has at least one $pK_a$ value and/or $pK_b$ value in the range of from about 4 to about 10, preferably from about 4.5 to about 9.5. Preferred buffering agents in the practice of the invention include, for example, phosphate buffers and acetate buffers. A "phosphate buffer" is a salt or salts of phosphoric acid. An "acetate buffer" is a salt of acetic acid.

Buffering agents are preferably employed where potassium persulfate is employed as the radical initiator. A preferred buffering agent for use with persulfate radical initiators is sodium acetate. A preferred amount of sodium acetate buffer is from about 50 wt. % to about 150 wt. %, based on the weight of persulfate initiator added to the reaction.

Antifoulant

The addition of a paraffin wax or hydrocarbon oil to the reaction serves as an antifouling to minimize or prevent polymer adhesions to the reactor components. Any long chain saturated hydrocarbon wax or oil can perform this function. The amount of oil or wax added to the reactor is an amount which serves to minimize the formation of polymer adhesions to the reactor components. The amount is generally proportional to the interior surface area of the reactor and may vary from about 1 to about 40 mg per square centimeter of reactor interior surface area. The amount of paraffin wax or hydrocarbon oil is preferably about 5 mg/cm² of the reactor interior surface area.

Polymerization Conditions

The temperature used for polymerization may vary from 20-160 degrees Celsius, depending on the initiator system chosen. The polymerization temperature is preferably from 35-130 degrees Celsius, and most preferably from 65-130 degrees Celsius. In one embodiment, the temperature is varied during the reaction.

The pressure used for polymerization may vary from 280-20,000 kPa, depending on the capabilities of the reaction equipment, the initiator system chosen, and the monomer selection. The polymerization pressure is preferably from 2,000-11,000 kPa, and most preferably from 2,750-6,900 kPa.

The polymerization occurs under stirring. The stirring may be constant, or may be varied to optimize process conditions during the course of the polymerization. In one embodiment, both multiple stirring speeds and multiple temperatures are used for controlling the reaction.

According to one embodiment of the process of the invention, a pressurized polymerization reactor equipped with a stirrer and heat control means is charged with water, preferably deionized water, one or more of the surfactants of the invention and at least one fluoromonomer. The mixture may optionally contain one or more of an additional non-fluorinated surfactant, a buffering agent, an antifoulant and a chain-transfer agent for molecular weight regulation of the polymer product.

Prior to introduction of the monomer or monomers, air is preferably removed from the reactor in order to obtain an oxygen-free environment for the polymerization reaction.

The order in which the polymerization components are assembled may be varied, provided that the surfactant of the invention is present in the aqueous reaction medium prior to the initiation of the polymerization of the fluoromonomer. An additional amount of surfactant may be fed to the reactor during the reaction.

In one embodiment, water, initiator, surfactant and optionally antifoulant, chain transfer agent and buffer are charged to the reactor, and the reactor heated to the desired reaction temperature. The flouromonomer(s) is then fed into the reactor, preferably at a rate which provides an essentially constant pressure.

Alternatively the fluoromonomer and initiator can be fed to the reactor, along with one or more of the optional ingredients. Other variations for fluoropolymer polymerization processes are anticipated, as known in the art.

The reactor pressure is primarily regulated by controlling the feed of gaseous monomer to the reaction. The reaction pressure is typically from about 280 to about 20,000 kPa, preferably from about 2,000 to about 11,000 kPa, more preferably from about 2,750 to about 6,900 kPa.

The monomer feed is terminated when the desired weight of monomer has been fed to the reactor. Additional radical initiator is optionally added, and the reaction is allowed to react out for a suitable amount of time. The reactor pressure drops as the monomer within the reactor is consumed.

Upon completion of the polymerization reaction, the reactor is brought to ambient temperature and the residual unreacted monomer is vented to atmospheric pressure. The aqueous reaction medium containing the fluoropolymer is then recovered from the reactor as a latex. The latex consists of a stable mixture of the reaction components, i.e., water, surfactant, initiator (and/or decomposition products of the initiator) and fluoropolymer solids.

Generally, the latex contains from about 10 to about 50 weight percent polymer solids. The polymer in the latex is in the form of small particles having a size range of from about 30 run to about 500 nm.

The product of the polymerization is a latex which can be used in that form, usually after filtration of solid byproducts from the polymerization process, or which can be coagulated to isolate the solids, which may then be washed and dried. For use in latex form, the latex can be stabilized by the addition of further surfactant, which may be the same or a different ionic surfactant, or may be of a different type, such as an non-ionic surfactant. For solid product, the latex may be coagulated mechanically or by the addition of salts or acids, and then isolated by well-known means such as by filtration. Once isolated, solid product can be purified by washing or other techniques, and it may be dried for use as a powder, which can be further processed into granules.

EXAMPLES

Examples 1-9

Deionized water was used. Reagents were of ACS reagent grade quality unless stated otherwise.

Surfactant solutions concentrations were adjusted for each surfactant according to its solubility characteristic.

In the Tables 1-3 below are reported the amount (mmoles) of monomer ($VF_2$) fed into the reactor as well as the measured latex solids content obtained at the end of the polymerization.

Example 1

Vinylidene fluoride homopolymer was made using octyl phosphonic acid surfactant (RHODAFAC ASI-100 from Rhodia) with potassium persulfate initiator. The experiments were carried out in a 25 ml reactor in which were added 480 microliter of a 0.25 wt % aqueous surfactant solution and 250 microliter of a 1 wt % aqueous solution of potassium persulfate. Deionized water was added to bring the total reactor charge to 4 g. The reactor was purged with nitrogen gas. The reactor was sealed, and agitation was started at 500 rpm. Agitation was maintained throughout the experiment. The reactor was heated to 83° C. The reactor was charged with vinylidene fluoride till the pressure reached was 490 psi. The reaction temperature was held at 83° C., and the reaction pressure was maintained at 490 psi by adding as needed vinylidene fluoride. When the amount of $VF_2$ consumed reached the desired level (about 6 mmoles in this example), the $VF_2$ feed was stopped. For a period of 30 minutes, agitation was continued and the temperature was maintained. The agitation and heating were discontinued. After cooling to room temperature, surplus gas was vented, and the latex was recovered. Gravimetric solids measurements of the latex were done.

In example 1, octyl phosphonic acid is used as the sole surfactant at 300 ppm based on total reactor charge.

TABLE 1

| Surfactant | 1 |
|---|---|
| Surfactant | octyl phosphonic acid |
| Amount (ppm, based on total reactor charge) | 300 |
| Initiator (ppm, based on total reactor charge) | 625 |
| mmoles of $VF_2$ fed into reactor | 6.3 |
| Solids (wt % on total latex) | 18.8 |

Example 2-6

In examples 2-6, a similar reaction as described in Example 1 was carried out. However, instead of using octyl phosphonic acid alone, it was used in combination with a co-surfactant. The combinations was made of octyl phosphonic acid (50 ppm based on total reactor charge), and a co-surfactant (charged at 150 ppm based on total reactor charge). Both the octyl phosphonic acid (OPA) surfactant and the co-surfactant were added as a 0.25 wt % aqueous solution prepared prior to starting the experiment.

TABLE 2

| | Example | | | | |
|---|---|---|---|---|---|
| | 2 | 3 | 4 | 5 | 6 |
| Surfactant | OPA | OPA | OPA | OPA | OPA |
| Charge (µL) | 80 µL | 80 µL | 80 µL | 80 µL | 80 µL |
| Co-surfactant | L7210 | T5863 | L7650 | L121 | L92 |
| Initiator (ppm) | 625 | 625 | 625 | 625 | 625 |
| $VF_2$ mmoles fed | 9.0 | 7.5 | 8.0 | 10.0 | 7.8 |
| solids | 23.7 | 24.8 | 21.6 | 23.6 | 21.0 |

Where:

PLURONIC L121 is an EO-PO-EO surfactant from BASF

PLURONIC L92 is an EO-PO-EO surfactant from BASF

SILWET L7210 is a polyalkyleneoxide modified polydimethylsiloxane from Crompton Corp.

TEGOPREN T5863 is a polyether modified polysiloxane from Degussa

SILWET L7650 is a polyalkyleneoxide modified polydimethylsiloxane from Crompton Corp.

In example 7-9, a similar reaction as described in Example 1 was carried out. However, the alkyl phosphonate surfactant used was lauryl phoshonic acid (LPA).

TABLE 3

| | 7 | 8 | 9 |
|---|---|---|---|
| Surfactant | LPA | LPA | LPA |
| ppm | 300 | 100 | 300 |
| Initiator (ppm) | 625 | 625 | 625 |
| Mmoles $VF_2$ fed | 8.0 | 12.4 | 9.8 |
| Solids (wt %) | 21.90 | 27.80 | 26.2 |

Example 10

Polyvinylidene Fluoride made using octyl phosphonic acid surfactant and potassium persulfate initiator. Deionized water was used. Reagents were of ACS reagent grade quality unless stated otherwise. Octyl phosphonic acid was of 96 wt % minimum purity. To a 7.5 liter, stainless steel reactor was added 4030 g of water, 4 g of paraffin wax, 100.0 g of an aqueous surfactant solution 1.400 wt % in octyl phosphonic acid, and 350.0 g of an aqueous initiator solution 0.500 wt % in potassium persulfate and 0.301 wt % in sodium acetate. The mixture was purged with argon and agitated for 0.5 hours. The reactor was sealed, agitation was continued, and the reactor was heated to 82° C. The reactor was charged with 380 g of vinylidene fluoride to a pressure of 4454 kPa. A steady feed of additional aqueous initiator solution was begun at a rate of about 36.0 g/h, and it was continued throughout the reaction. The reaction temperature was held at 82° C., and the reaction pressure was maintained at 4480 kPa by adding as needed vinylidene fluoride. After 2.65 hours, the feed of vinylidene fluoride was stopped. An amount of vinylidene fluoride, 2212 g, had been added to the reactor. For a period of 0.3 hours, agitation was continued, the temperature was maintained, and the feed of aqueous initiator solution was continued. The feed of aqueous initiator was stopped, and then for a period of 0.3 hours, agitation and the reaction temperature were maintained. The agitation and heating were discontinued. After cooling to room temperature, surplus gas was vented, and the reactor was emptied of latex through a stainless steel mesh. Negligible coagulum had formed during the reaction. Gravimetric solids measurements of the latex showed the solid polymer yield to be 90 wt % based on the weight of the vinylidene fluoride fed to the reactor. The amount of potassium persulfate which was used to convert the monomers to polymer was 0.104 wt %, based on the weight of vinylidene fluoride monomer.

What is claimed is:

1. A process for preparing a fluoropolymer in an aqueous reaction medium comprising:
   a) forming an aqueous emulsion comprising at least one radical initiator, at least one non-fluorinated alkyl phosphonic acid surfactant or salt thereof, and at least one fluoromonomer, and
   b) initiating polymerization of said fluoromonomer;
   wherein said aqueous emulsion consists of no fluorinated surfactant.

2. The process of claim 1, wherein said alkyl phosphonic acid surfactant is in the ammonium or sodium salt form.

3. The process of claim 1 wherein said alkyl phosphonic acid surfactant is the ammonium or sodium salt of octyl phosphonic acid, dodecyl phosphonic acid, or mixtures thereof.

4. The process of claim 1 wherein said alkyl phosphonic acid contains linear, branched or cyclic hydrocarbon groups having from 6 to 20 carbon atoms as the hydrophobic portion.

5. The process of claim 4 wherein said alkyl phosphonic acid contains linear, branched or cyclic hydrocarbon groups having from 6 to 12 carbon atoms as the hydrophobic portion.

6. The process of claim 1 wherein said alkyl phosphonic acid surfactant is present at from 0.001 to 2.0 percent, based on the total weight of monomer.

7. The process of claim 1 wherein said alkyl phosphonic acid is present at from 0.001 to 0.5 percent, based on the total weight of monomer.

8. The process of claim 1 wherein said at least one fluoromonomer is selected from the group consisting of vinylidene fluoride, hexafluoropropene, tetrafluoroethylene, trifluoroethylene, chlorotrifluoroethylene, vinyl fluoride, and combinations thereof.

9. The process of claim 1 wherein said at least one fluoromonomer comprises vinylidene fluoride.

10. The process of claim 1 wherein said fluoropolymer is a vinylidene fluoride copolymer comprising at least one comonomer selected from the group consisting of tetrafluoroethylene, trifluoroethylene, hexafluoropropene, chlorotrifluoroethylene, vinyl fluoride, and combinations thereof.

11. An aqueous fluoropolymer emulsion composition comprising:
   a) at least one radical initiator;
   b) at least one alkyl phosphonic acid surfactant, or salt thereof; and
   c) at least one fluoropolymer,
   wherein said aqueous emulsion consists of no fluorinated surfactant.

12. A fluoropolymer resin composition comprising a fluoropolymer and from 0.001 to 2.0 percent, based on the weight of the fluoropolymer, of at least one alkyl phosphonic acid, or salt thereof, and wherein said fluoropolymer resin consists of no fluorinated surfactant.

* * * * *